UNITED STATES PATENT OFFICE.

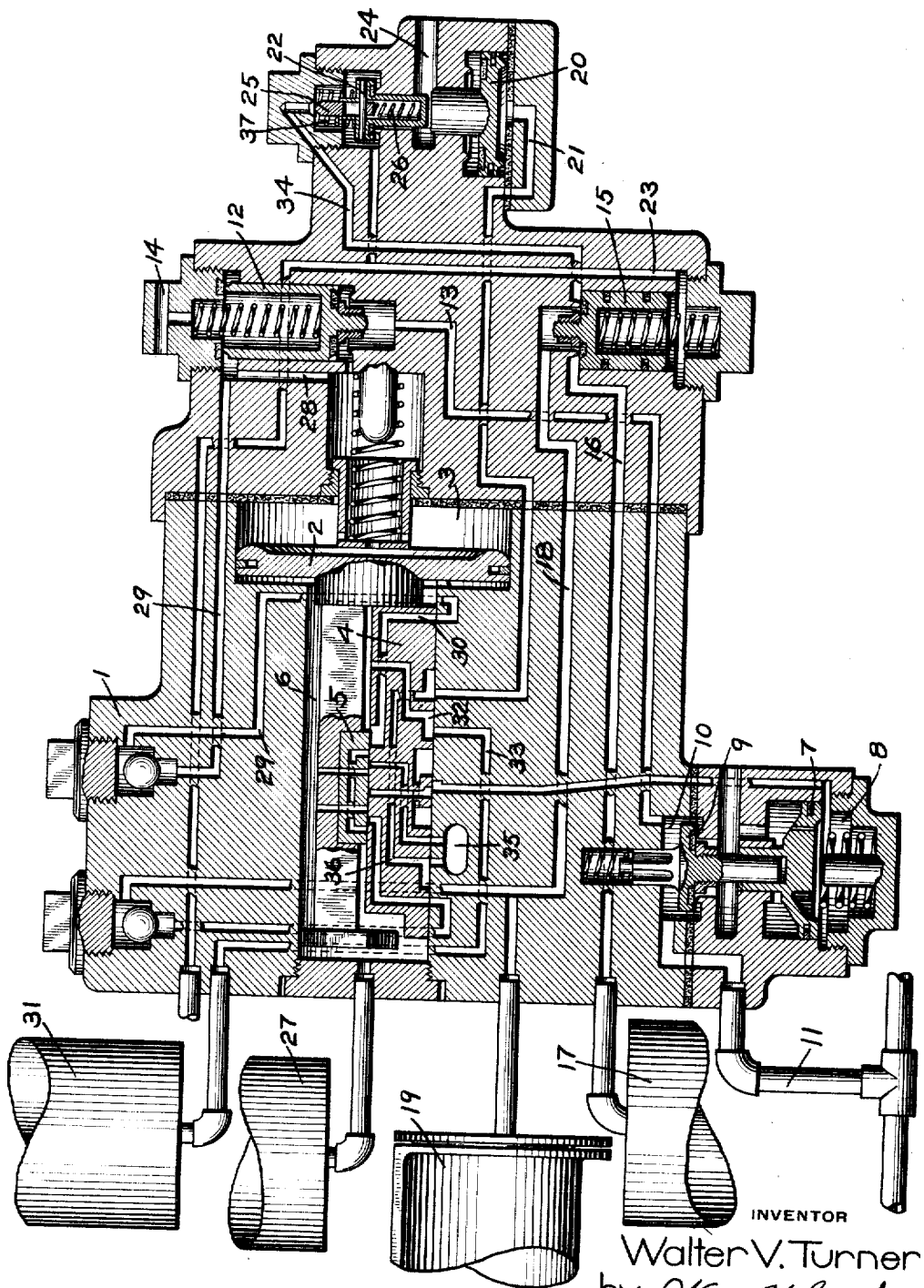

WALTER V. TURNER, OF WILKINSBURG, PENNSYLVANIA, ASSIGNOR TO WESTINGHOUSE AIR BRAKE COMPANY, OF WILMERDING, PENNSYLVANIA, A CORPORATION OF PENNSYLVANIA.

FLUID-PRESSURE BRAKE.

1,309,786.   Specification of Letters Patent.   Patented July 15, 1919.

Application filed August 22, 1918. Serial No. 250,989.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brakes, of which the following is a specification.

This invention relates to fluid pressure brakes, and more particularly to an emergency valve mechanism.

It has heretofore been proposed to provide a valve for supplying fluid at high pressure to the brake cylinder in an emergency application of the brakes and a pilot valve device operated in emergency for effecting the opening of the high pressure emergency valve.

In order to normally balance the fluid pressures on opposite sides of the high pressure emergency valve, a restricted port is provided through the valve.

This equalizing port is sometimes liable to become clogged up, particularly by the freezing of moisture therein in the winter time, and the desired operation is thus apt to be interfered with.

The principal object of my invention is to avoid the above difficulty by eliminating the restricted equalizing port, while providing means for normally equalizing the fluid pressures on the valve.

In the accompanying drawing, the single figure is a central sectional view of an emergency valve mechanism, embodying my improvement.

As shown in the drawing, the emergency valve mechanism may comprise a casing 1 containing an emergency valve device, a quick action valve mechanism, a protection valve device, an emergency high pressure valve, and a pilot valve device.

The emergency valve device may comprise a piston 2 contained in piston chamber 3 and a main slide valve 4 and an auxiliary valve 5, mounted in valve chamber 6, and adapted to be operated by piston 2.

The quick action valve mechanism may comprise a piston 7 contained in piston chamber 8 and a valve 9 contained in valve chamber 10, which is connected to brake pipe 11.

The protection valve device comprises a valve piston 12, having one side connected by passage 13 to valve chamber 10 and the brake pipe 11 and the opposite side to an atmosphere exhaust port 14.

The high pressure valve may comprise a valve piston 15 having its outer seated area at one side connected by passage 16 to the main reservoir 17 and the inner seated area by passage 18 to brake cylinder 19.

The pressure on the opposite side of the high pressure valve is controlled by a pilot valve device comprising a piston 20 having one side connected to a passage 21, leading to the seat of slide valve 4, and a valve 22, operated by piston 20 for venting fluid from the spring side of valve piston 15 through passage 23 to an exhaust port 24.

According to my invention, fluid under pressure is normally supplied to the spring chamber side of valve piston 15 past a valve 25, which is mounted in the valve 22 and is subject to the pressure of a spring 26 contained within the valve 22.

In operation, fluid supplied to the brake pipe 11 flows to valve chamber 10 and through passage 13 to the seated area of protection valve 12. When the brake pipe pressure has been increased to a predetermined degree, the valve piston 12 moves to its outer seat, opening pipe 11 to the piston chamber 3.

The piston 2 is then shifted to normal position, as shown in the drawing, in which valve chamber 6 and quick action reservoir 31 is also charged through port 32 and passage 33.

Fluid from the main reservoir 17 flows through passage 16 to the outer seated area of the high pressure valve 15 and thence through passage 34 to valve 25.

Normally, the piston 20 is maintained in the position shown in the drawing, since passage 21 is connected to the exhaust port 35 through passage 21 and cavity 36 in slide valve 4, so that valve 22 is seated by spring 37, while valve 25 is moved to its open position by the valve 22, thus permitting the flow of fluid from the main reservoir 17 through passage 34 to passage 23, which leads to the spring chamber side of valve piston 15.

While the outer seated area of valve piston 15 is exposed to main reservoir pressure on one side, the full area at the opposite side is open to main reservoir pressure, so that the valve piston is normally held in the seated position, as shown in the drawing.

Upon a sudden reduction in brake pipe pressure to effect an emergency application of the brakes, the protection valve 12 is caused to move to its inner seat, so that fluid is vented from piston chamber 3, through passage 28 to exhaust port 14.

The emergency piston 2 is then shifted to emergency position, in which fluid under pressure is supplied from valve chamber 6, through port 32 to passage 21. Fluid thus admitted to piston 20 operates the same so as to open the valve 22 for venting fluid from the spring side of the high pressure valve 15 through passage 23 to exhaust port 24, and the main reservoir pressure acting on the outer seated area of the valve 15 then operates to open the valve and permit the direct supply of fluid from the main reservoir to the brake cylinder.

When the valve 22 moves to its open position, the valve 25 is thereby shifted so as to close communication through passage 34 from the main reservoir to the spring side of valve 15 and furthermore, leakage from the main reservoir to the exhaust port 24 through passage 34 is prevented.

The valve 25 is made movable relatively to the valve 22, so as to insure that the piston 20 will always move to its upper seat, while the valve 25 will always seat, regardless of inaccuracies in workmanship and the like.

Having now described my invention, what I claim as new, and desire to secure by Letters Patent, is:—

1. In a fluid pressure brake, the combination with a source of fluid under pressure and a brake cylinder, of valve means subject on one side to fluid pressure from said source for supplying fluid to the brake cylinder, a pilot valve device for controlling the operation of said valve means and a valve controlled by said pilot valve device for normally supplying fluid to the opposite side of said valve means.

2. In a fluid pressure brake, the combination with a source of fluid under pressure and a brake cylinder, of a valve piston subject on one side to fluid pressure from said source for supplying fluid to the brake cylinder, a valve for supplying fluid from said source to the opposite side of said valve piston, and a pilot valve device for normally opening said valve and operated in an emergency application of the brakes for closing said valve and for venting fluid from one side of said valve piston.

3. In a fluid pressure brake, the combination with a main reservoir and a brake cylinder, of a valve piston subject on one side to main reservoir pressure for controlling the supply of fluid from the main reservoir to the brake cylinder, a valve for controlling the admission of fluid from the main reservoir to the opposite side of said valve piston, and a pilot valve device for normally holding said valve in open position and operated upon an emergency application of the brakes for closing said valve and for venting fluid from one side of said valve piston.

In testimony whereof I have hereunto set my hand.

WALTER V. TURNER.

Copies of this patent may be obtained for five cents each, by addressing the "Commissioner of Patents, Washington, D. C."